I. K. HISEY & R. M. WARDLE.
WATER FILTER.
APPLICATION FILED MAY 22, 1909.
939,418.
Patented Nov. 9, 1909.
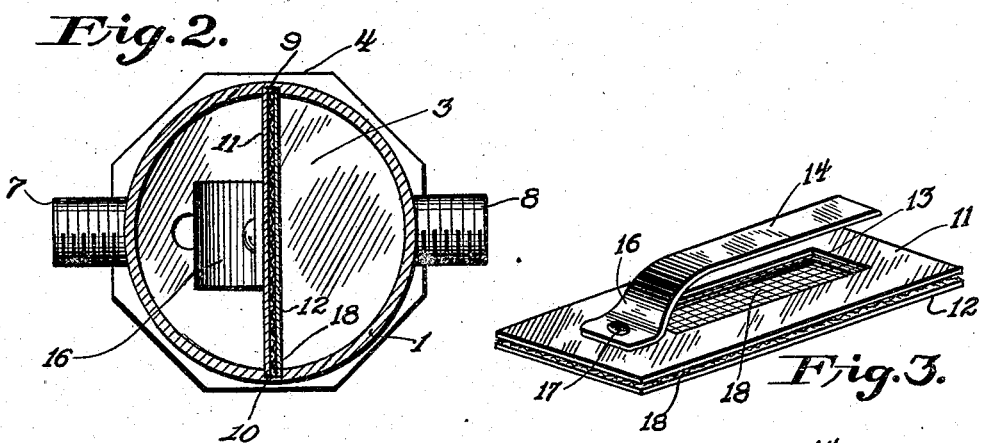
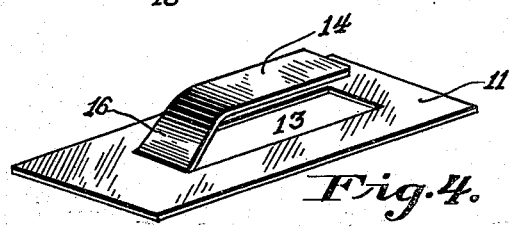
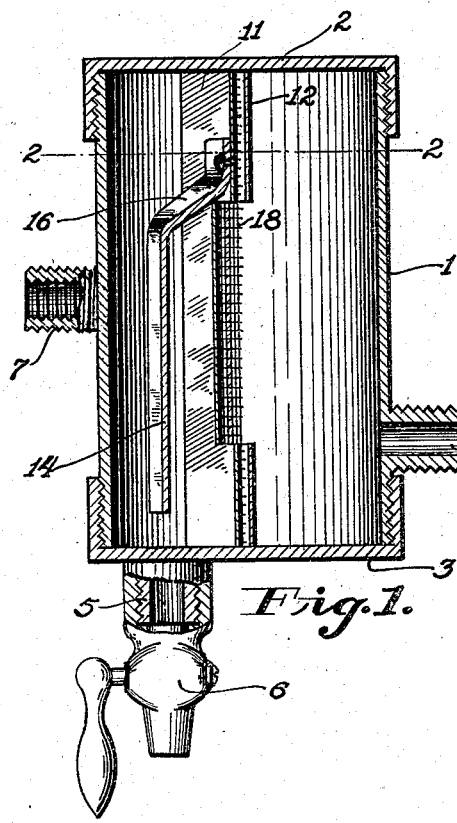
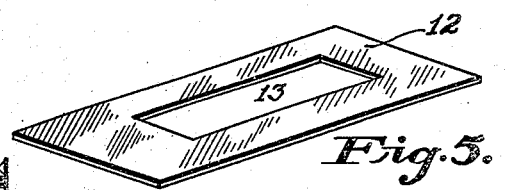
Witnesses
Inventors
Isaac K. Hisey,
Randolph M. Wardle,
By E. E. Vrooman,
their Attorney.

UNITED STATES PATENT OFFICE.

ISAAC K. HISEY AND RANDOLPH M. WARDLE, OF CARLTON, OREGON.

WATER-FILTER.

939,418.  Specification of Letters Patent.  Patented Nov. 9, 1909.

Application filed May 22, 1909. Serial No. 497,582.

*To all whom it may concern:*

Be it known that we, ISAAC K. HISEY and RANDOLPH M. WARDLE, citizens of the United States, residing at Carlton, in the county of Yamhill and State of Oregon, have invented certain new and useful Improvements in Water-Filters, of which the following is a specification, reference being had therein to the accompanying drawing.

This invention relates to filters or strainers for water supply pipes equally adapted for household purposes or for use in connection with feed pipes of boilers, pumps &c., and the principal object of the same is to provide a filter or strainer which can be cheaply constructed, and readily connected with a supply pipe so as to thoroughly separate the foreign particles from the liquids passing through the same.

It will be understood, of course, that the essential features of the invention involved in carrying out the objects of the invention generally stated above are necessarily susceptible of changes in details and structural arrangements, one practical and preferred embodiment of the same being shown in the accompanying drawings, wherein—

Figure 1 is a central longitudinal sectional view of the improved filter or strainer. Fig. 2 is a horizontal sectional view taken on the line 2—2, Fig. 1. Fig. 3 is a perspective view of the strainer. Figs. 4 and 5 are similar views of the plates between which the straining screen is retained.

Referring to said drawings by numerals, it will be observed that the improved strainer or filter comprises primarily a cylindrical vessel 1 having its ends threaded on its exterior. The vessel 1 is preferably used in a vertical position its upper end being closed by means of a flanged cap 2 having a threaded engagement with the threads thereon, and the lower end is similarly closed by means of a bottom cap 3. Both of said caps are preferably provided with a nut-shaped exterior 4, as is shown in Fig. 2. The bottom cap 3 is provided with a pendent tubular extension 5 threaded exteriorly for engagement with a drain cock or the like 6.

The vessel 1 on one side, and preferably at its central portion, is provided with a laterally projecting tubular extension 7 which is threaded for engagement with a supply pipe, not shown. The opposite side of said vessel is also provided with a laterally projecting tubular extension 8 for engagement with a pipe (not shown) for conveying the filtered water from said vessel. The tubular extension 8 is preferably arranged in a lower vertical plane than the extension 7.

The inner surface of the vessel 1 is provided with longitudinally arranged, oppositely disposed grooves 9 and 10, respectively, said grooves extending from end to end of said vessel.

The strainer for the improved filter is composed of two rectangular plates 11 and 12 which are of the same length as the vessel 1 and of a width to permit of a snug, but sliding fit within the oppositely disposed grooves 9 and 10. Each plate is provided with a central, elongated slot or opening 13. The plate 11 is equipped with a guard strip 14 which is substantially the same width and length as its slot and is retained in spaced parallel relation over the slot by means of the angular end 16. Said strip 14 may be integral with its plate, as indicated in Fig. 4, or have its angular end riveted to the plate as shown in Fig. 3 and designated by the numeral 17. In both forms of the invention, the guard strip has one free end.

A screen 18 is held between said plates so as to act upon any material passing through the slots therein. Said screen is of the same shape and size of said plates.

In practical use, the screen is placed between the plates, and the plates and screen are forced into the vessel 1, being guided by means of the grooves 9 and 10 which receive the edges of said plates and interposed screen. The plates are arranged so that the guard strip 14 will project across the inlet extension 7 so as to deflect the incoming liquid and cause it to fall to the bottom of the vessel until it overflows through the screen and into the opposite side of the vessel and thence out through the discharge extension 8. By this means the sediment is deposited upon the bottom of the vessel and may be readily drained out through the tubular extension 5 of the cap 3.

It will be seen from the foregoing that all parts of the filter may be separated to permit a thorough cleaning of the same, and when in an assembled condition, the filter is tightly sealed except through its inlet and discharge and the drain extension.

It will be understood, of course, that the nut shaped exterior of the caps is for the purpose of permitting the tightening or loosening of the same by means of a wrench.

What we claim as our invention is:—

1. A device of the character described comprising a vessel provided with an inlet and a discharge, slotted plates slidably fitting said vessel, a screen interposed between said plates, and a deflecting strip carried by one of said plates and arranged in the path of the incoming liquid.

2. A device of the character described comprising a vessel provided with an inlet and a discharge, slotted plates slidably fitting said vessel, a screen interposed between said plates, and a deflecting strip having an angular end connection with one of said plates and arranged parallel with the slot therein and also in the path of the incoming liquid.

3. A device of the character described comprising a vessel provided with an inlet and a discharge, said vessel being provided with oppositely disposed side grooves, a pair of slotted plates slidably fitting said grooves, a screen interposed between said plates, and a guard strip carried by one of said strips and arranged in the path of movement of the incoming liquid.

4. A device of the character described comprising a vessel, sealing caps for each end thereof, plates slidably mounted in said vessel and provided with a central elongated slot, a screen between said plates and covering the slots therein, and a guard carried by one of said plates and arranged parallel with but spaced from the slot therein.

5. A device of the character described comprising a vessel provided with an inlet and a discharge, sealing caps for each end thereof, a pair of plates slidably fitting said vessel and each provided with a complementally arranged centrally located slot, a screen between said plates and covering the said slots, and a guard strip carried by one of said plates and arranged parallel with but spaced from the slot therein and also in the path of the incoming liquid.

6. A device of the character described comprising a vessel provided with an inlet and a discharge, a screening device therein, a guard strip carried by said screening device and held in the path of the incoming liquid, detachable end caps for said vessel, and a drain pipe extension projecting from one of said caps.

7. A device of the character described comprising a vessel provided with oppositely disposed laterally projecting inlet and discharge extensions, detachable end caps for said vessel, a drain pipe extension projecting from one of said caps, a filtering screen in said vessel, and a deflectory strip in said vessel and arranged in the path of the incoming liquid.

In testimony whereof we hereunto affix our signatures in presence of two witnesses.

ISAAC K. HISEY.
RANDOLPH M. WARDLE.

Witnesses:
MARTIN L. FRANCE,
FRANK McCUNE.